United States Patent
Arendt

[19]

[11] Patent Number: 5,810,372
[45] Date of Patent: Sep. 22, 1998

[54] SHOPPING CART HANDLE STRUCTURE AND METHOD OF MANUFACTURE

[76] Inventor: Christopher J. Arendt, 27572 S. Turf Hill Dr., Mundelein, Ill. 60060

[21] Appl. No.: 784,459

[22] Filed: Jan. 16, 1997

[51] Int. Cl.$^6$ ..................................................... G09F 3/20
[52] U.S. Cl. ................................... 280/33.992; 16/114 R; 40/308
[58] Field of Search ......................... 280/33.991, 33.992; 16/111 R, 114 R; 40/308, 611, 325, 661.12, 661.03, 661, 660; 403/312

[56] References Cited

U.S. PATENT DOCUMENTS

| | | |
|---|---|---|
| D. 321,577 | 11/1991 | Ellis . |
| D. 328,812 | 8/1992 | Prichett . |
| D. 329,314 | 9/1992 | Lawrence . |
| 2,588,050 | 3/1952 | Rutherford ................................ 40/611 |
| 2,687,589 | 4/1954 | Brockway . |
| 2,803,849 | 8/1957 | Peters ................................... 280/33.992 |
| 2,962,827 | 12/1960 | LaChance . |
| 3,270,454 | 9/1966 | LaChance . |
| 3,281,978 | 11/1966 | Drugan . |
| 3,866,649 | 2/1975 | Bringmann . |
| 4,021,953 | 5/1977 | Couch ...................................... 40/308 |
| 4,513,983 | 4/1985 | Calder . |
| 4,683,609 | 8/1987 | Trubiano . |
| 5,301,443 | 4/1994 | Gori . |

FOREIGN PATENT DOCUMENTS

| | | | |
|---|---|---|---|
| 3528898 | 2/1987 | Germany .......................... | 280/33.992 |

*Primary Examiner*—J. J. Swann
*Assistant Examiner*—Avraham Lerner
*Attorney, Agent, or Firm*—Meroni & Meroni

[57] ABSTRACT

An improvement of a push cart handle structure is provided to carry advertising indicia on a shopping cart structure. The improvement includes a handle structure having an elongated sleeve which is coaxially mounted on and bonded to an elongated metal tube so that the sleeve and metal tube are in a fixed and joined together. The elongated sleeve has an enlarged topside section and the section has an upwardly facing exterior surface and a transparent arcuately shaped cover engageable against the exterior surface. The cover has cover ends which extend angularly in a common direction towards each other from opposite sides of the cover. The elongated sleeve also has sockets which extend into the enlarged topside section and an arcuately shaped member which carries the advertising indicia and which is nestingly engaged against the upwardly facing surface on the elongated sleeve. The cover ends engage in the sockets to secure both the cover and the arcuately shaped member carrying the advertising indicia in unitary assembly with the elongated sleeve.

18 Claims, 5 Drawing Sheets

SHOPPING CART HANDLE STRUCTURE AND METHOD OF MANUFACTURE

BACKGROUND OF THE INVENTION

1. Field of the Invention

The present invention relates generally to a new and improved shopping cart handle structure and more specifically to a new combination of a shopping cart structure with the aforesaid shopping cart handle and its method of manufacture.

2. Description of the Prior Art

In the past, there have been a number of prior types of handle structures for push-type shopping carts. This invention, more particularly, is concerned with the provision of a handle structure which lends itself to having advertising indicia which is carried by the shopping cart handle structure and where the advertising indicia can be readily changed at pre-selected time intervals so that the advertising indicia can be modified on a daily or on a weekly basis as may be desired.

Shopping cart handle structures with advertising indicia have been used in various forms. One form of an advertising indicia usable with a shopping cart can be found in U.S. Pat. Nos. 2,687,589, 3,270,454 and 3,281,978. This form is found in combination with various types of attachments that are physically secured by fasteners through the handle structure and which exist as separate apparatuses. These apparatuses extend above the shopping cart in closer proximity to the person's face in an attention-getting position. Another form of advertising which has been disclosed with shopping cart handles is found in U.S. Pat. No. 4,683,609.

Still other types of shopping cart handles have been used in the past in addition to those discussed above. These handles have had holders for plastic inserts to carry advertising indicia. This type of a handle with an insert carrying advertising indicia has been of such construction that water, dirt, bacteria and the like have been able to gain access beneath a transparent window insert where the seal is imperfect causing the handle to become unsightly with an unclean appearance as a result of extended use.

As will be described in greater detail hereinafter, the improved handle structure and method of manufacture of the present invention differs from those previously proposed and employs a number of novel features that render it highly advantageous over the prior art.

SUMMARY OF THE INVENTION

The present invention is particularly concerned with a new and improved shopping cart handle construction and method of manufacture where it has a clean and an attractive life time appearance which requires a minimum of cleaning and where an insert with advertising indicia is again used, but with an insert of a larger circumferential dimension or arcuate dimension so that it extends on opposite sides of a round handle structure.

According to my invention, the new handle construction is particularly shaped and sized to allow advertising inserts to be slipped beneath the window or cover as the window inserts are not bonded to the handle structure as before. Now for the first time with shopping cart handle structures of the present type, grocers and retail marketing people can easily put changing messages beneath the window part of the handle structure so that the shopper can see points that the retailer wants to have the shoppers note when the cart is in use.

Yet another feature of my invention concerns a new handle construction where the window inserts can be readily replaced with new inserts from one end of the handle structure and where the window inserts are totally protected so that water, dirt, bacteria and the like cannot gain access under the window and so that the exterior of the window can be readily cleaned since it is free of any crevices where water, dirt, bacteria and the like can gain entry into the interior of the handle as before.

To achieve the foregoing and other objectives, and in accordance with the purposes of the present invention a push cart handle structure for a shopping cart is provided. The handle structure includes an elongated metal tube and an elongated sleeve mounted coaxially on the elongated metal tube. The elongated sleeve has an upwardly facing exterior surface. A transparent arcuately shaped cover is engageable against the upwardly facing exterior surface. The transparent arcuately shaped cover has a pair of angularly extending cover ends extending inwardly in a hook-like configuration. A pair of sockets extend into the elongated sleeve parallel to one another. The transparent arcuately shaped cover has the angularly extending cover ends being engageable in respective sockets to secure the transparent arcuately shaped cover in unitary assembly with the elongated sleeve. The upwardly facing exterior surface is adapted for receiving an arcuately shaped member carrying advertising indicia nestingly engaged against the upwardly facing exterior surface and positionable between the upwardly facing exterior surface and the transparent arcuately shaped cover.

Other objects, features and advantages of the invention will become more readily apparent upon reference to the following description when taken in conjunction with the accompanying drawings.

DETAILED DESCRIPTION OF THE PREFERRED EMBODIMENT

Figure 1:
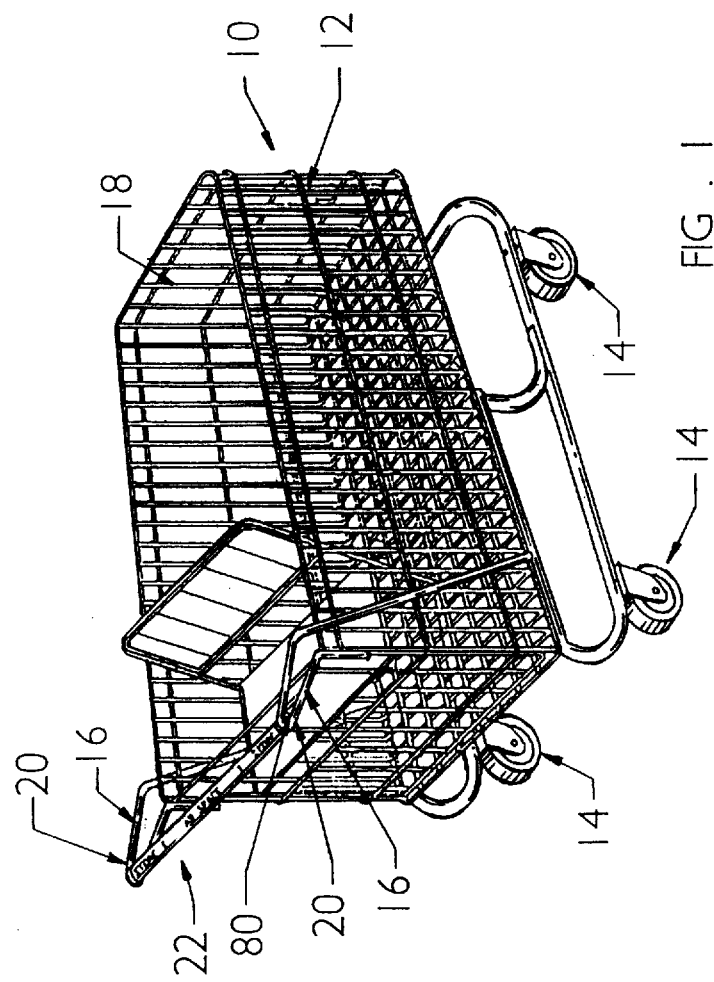
FIG. 1 is a perspective view of a shopping cart having the improved handle structure in accordance with the present invention.

Referring now to the drawings, FIG. 1 illustrates a shopping or grocery cart structure 10 including a shopping push cart 12 mounted on wheels 14. The cart 12 includes a pair of spaced apart arms 16 which extend rearwardly from an open top article-receiving and support basket 18 of the cart 12.

In a preferred embodiment, the spaced apart arms 16 include a pair of spaced apart wire loops 20 adapted for connection of a push cart handle structure 22 therebetween. The push cart handle structure 22 being mounted at one end of the shopping push cart 12 for pushing the cart 12 on the wheels 14.

Figure 2:
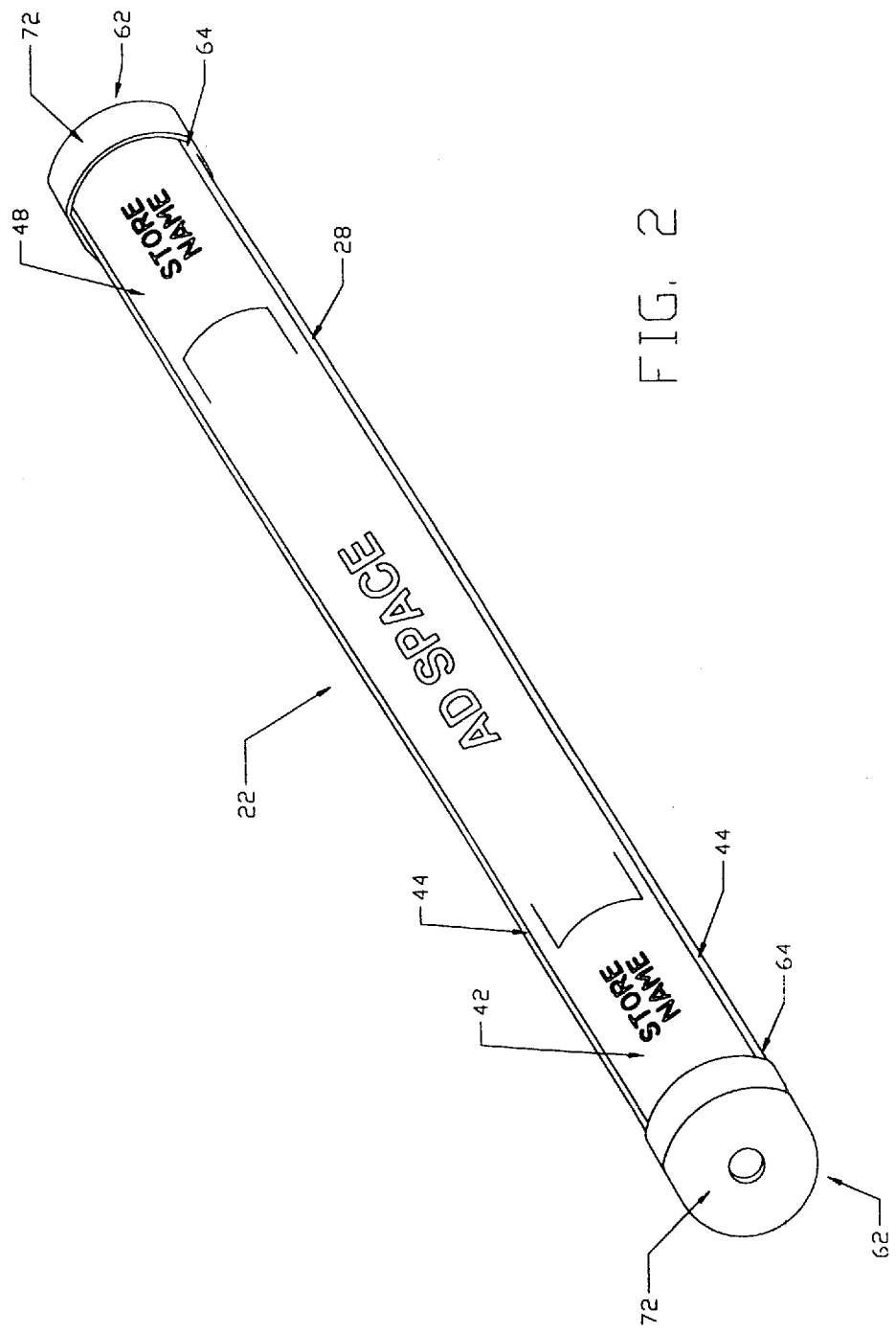
FIG. 2 is a perspective view of the handle structure of the present invention.
Figure 3:
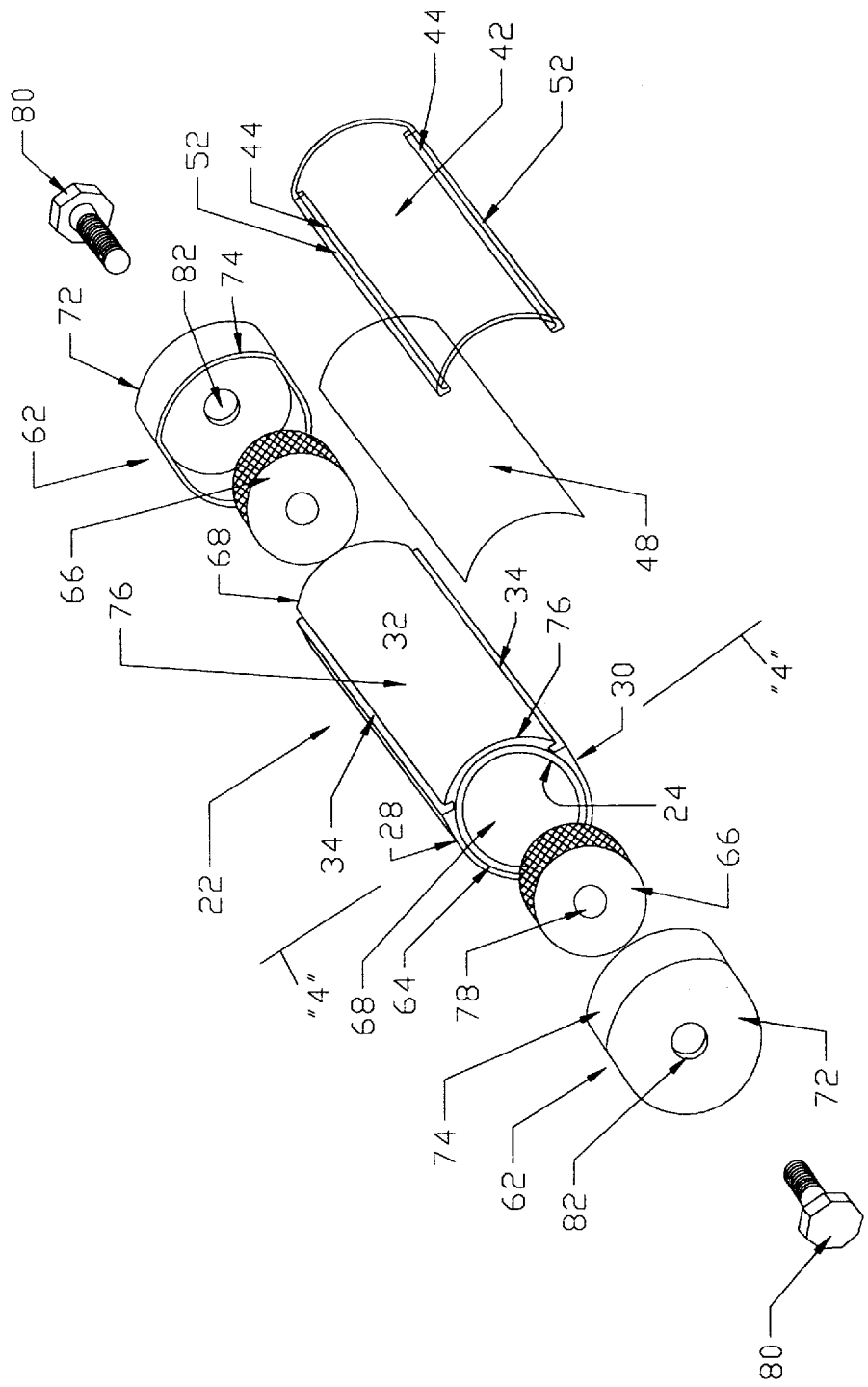
FIG. 3 is an exploded perspective view of the handle structure.
Figure 4:
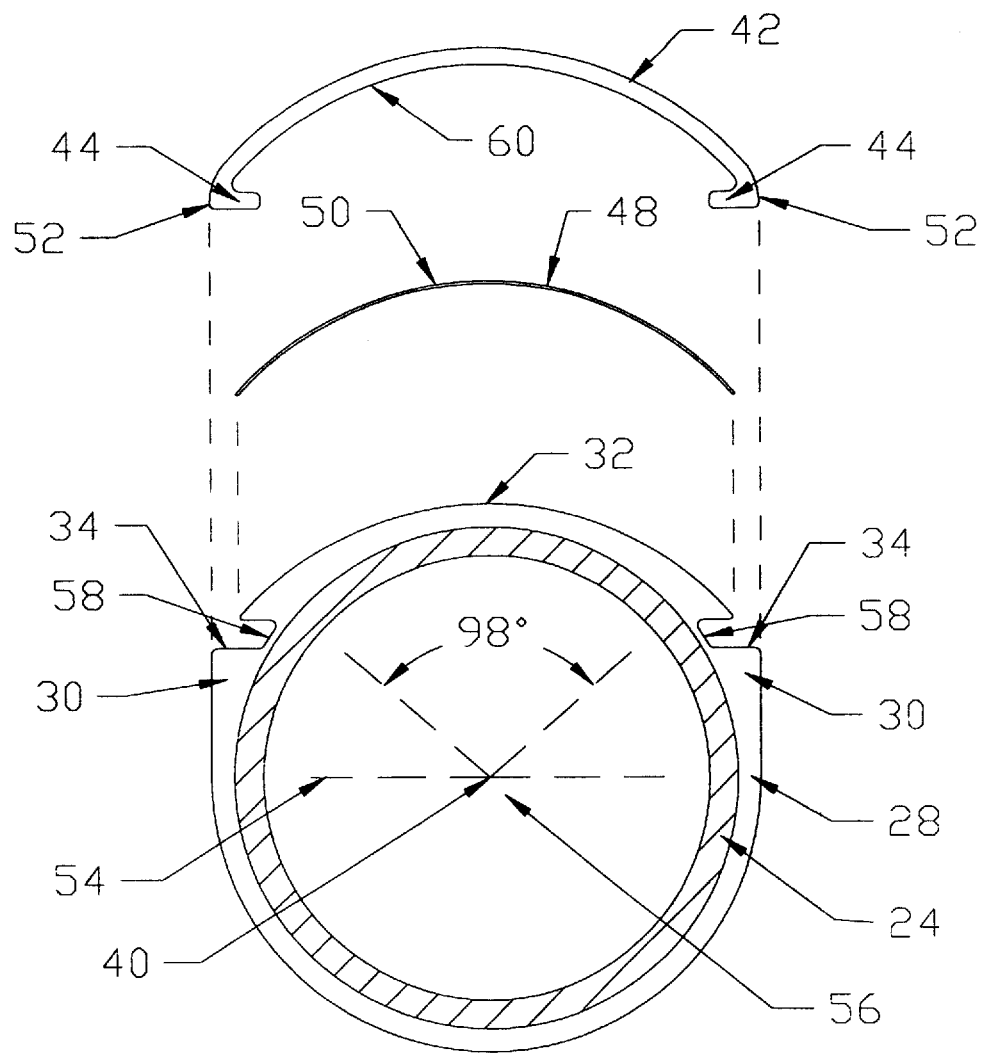
FIG. 4 is an exploded sectional view of the handle structure taken along line 4—4 of FIG. 3.
Figure 5:
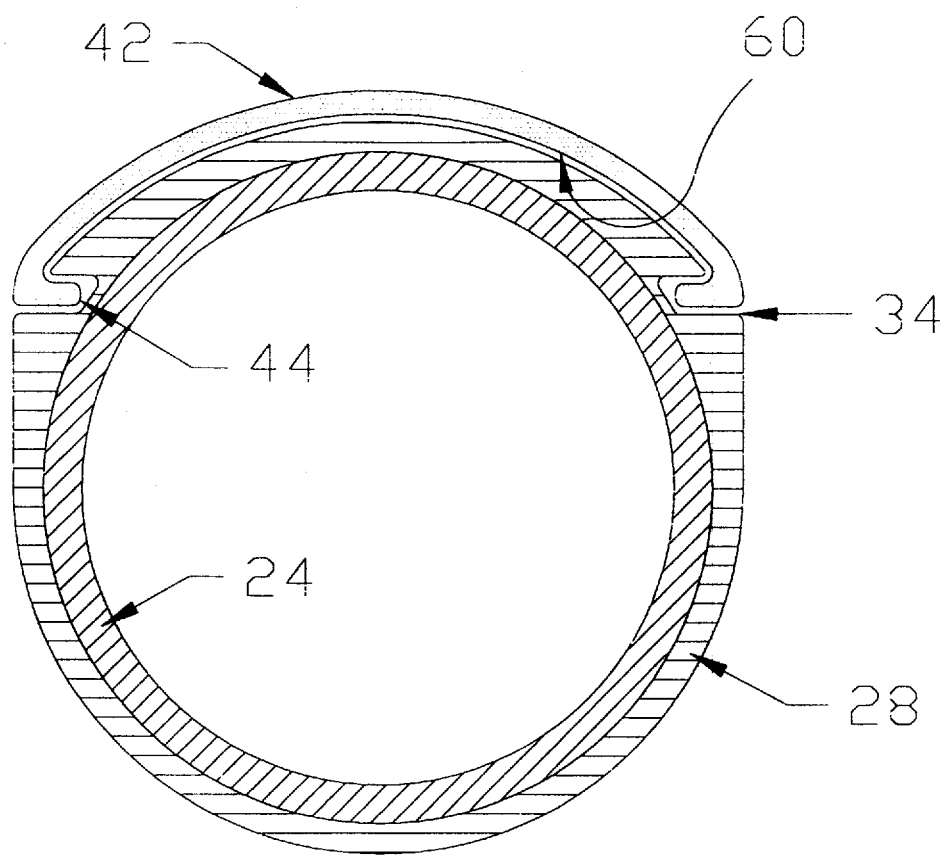
FIG. 5 is an enlarged vertical section showing the cover and its cover ends fully engaged in the sockets in the sleeve.

Referring to FIGS. 2–4, the push cart handle structure 22 includes an elongated metal tube 24 preferably formed of steel. An elongated roundish sleeve 28 is mounted coaxially on the elongated metal tube 24. A bond, as later described, secures the elongated metal tube 24 and the elongated sleeve 28 in fixed joined relation together. The elongated sleeve 28 has an enlarged topside section 30. The enlarged topside section 30 having an upwardly facing exterior surface 32.

A pair of sockets or grooves 34 are provided along opposite sides 36 of the surface 32 and extend parallel to one another and into the enlarged topside section 30 of the elongated sleeve 28. The sockets 34 are positioned such that openings 38 in the sockets 34 face opposite directions relative to one another. The sockets 34 are spaced apart from one another over 90° from a longitudinal axis 40 of the elongated metal tube 24, as best illustrated in FIG. 4. In a preferred embodiment, the spaced apart distance is shown at 98° on an uppermost quarter of the handle structure 22 to inhibit dirt from gaining entry beneath a transparent arcuately shaped cover or window 42.

The transparent arcuately shaped cover or window 42 formed of butyrate or lexan is engageable against the upwardly facing exterior surface 32. The cover 42 has a thickness typically in the range of 0.025 to 0.050 inches, and preferably between 0.035 to 0.040 inches. The cover 42 has angularly extending cover ends 44 extending inwardly in a common direction towards one another in a hook-like configuration from opposite sides 46 of the cover 42. An arcuately shaped member 48 carrying advertising indicia is nestingly engaged against the upwardly facing exterior surface 32 on the elongated sleeve 28. The member 48 can be formed of any suitable material that preferably has an outer surface 50 that can be printed upon and can be adapted for engagement against the surface 32.

The cover 42 has the angularly extending cover ends 44 being engageable in the sockets 34 to secure both the cover 42 and the arcuately shaped member 48 in unitary assembly with the elongated sleeve 28. Preferably, the cover 42 has opposite edges 52 which are positioned above a horizontal axis 54 extending through a midpoint 56 of the push cart handle structure 22 for minimizing the risk that the cover 42 will become damaged or cracked when the handle structure 22 is subjected to an impact.

The angularly extending cover ends 42 are slidable longitudinally relative to the push cart handle structure 22 with the cover ends 42 being retainingly engageable in the sockets 34. As best shown in FIG. 4, the sockets 34 for receiving the cover ends 44 have closed socket bottoms 58 positioned remote and physically separated from a cavity 60 underlying the cover 42 to prevent the ingress of water and dirt into the cavity 60 to contaminate the cavity 60 and the arcuately shaped member 48 carrying the advertising indicia.

Referring to FIGS. 2 and 3, mounting structures 62 are provided at opposite ends 64 of the elongated metal tube 24. The mounting structures 62 include a pair of stopper inserts 66 retainingly secured in opposite open ends 68 of the elongated metal tube 24 for closing the open ends 68. In a preferred embodiment, the inserts 66 have knurled outer surfaces 70 and are secured within the open ends 68 in a friction press fit. A pair of handle end covers 72 are telescoped over opposite ends of the handle structure 22. The handle end covers 72 each have an annular flange 74 which is sized for extending around an outer perimeter 76 of the elongated sleeve 28 including the enlarged topside section 30. The inserts 66 each have a threaded aperture 78 sized to receive a bolt 80. The end covers 72 also have apertures 82 to allow the respective bolts 80 to extend therethrough. The bolts are preferably 1.0 to 1.5 inches in length and secure the handle structure 22 to the arms 16 of the cart 12, as shown in FIG. 1.

In use, advertising inserts or members 48 are slipped beneath the window or cover 42 as the inserts 48 are not bonded to the handle structure 22. Now for the first time with shopping cart handle structures of the present type, grocers and retail marketing people can easily put changing messages beneath the window 42 of the handle structure 22. The cover 42 can be slid on by moving the cover longitudinally relative to the sleeve and by aligning the cover ends 44 with the sockets 34 and moving these parts relative to one another thereby causing a cover to be fully engaged on the sleeve as shown in my drawings and particularly as shown in FIGS. 1 and 2. To remove the cover, the procedure can be reversed to cause the cover 42 to be moved in an opposite direction and only after one of the caps 72 has been moved off of an end of the cover and the sleeve. If desired, the cover can be disengaged from the sleeve by causing the bolt 80 to be partially disengaged from its threads whereby the cover can be moved out and allowed to rest on the threaded shank of the bolt 80 and so that the advertising insert or member 48 can be pulled from beneath the cover and removed to allow for a new advertising insert to be slid beneath the cover 42 as a replacement. The thickness of the cover can be varied so that it can be either a throw away or can be re-used. Still further, the cover can also be engaged in place by first engaging one of the ends 44 in the socket 34 on one side of the sleeve 24 and then flexing the cover 42 to cause the end to be snapped into the socket 34 to fully engage the cover on the sleeve 24. If the cover is to be replaced by snapping the cover in place, it would be necessary to re-engage the end cover 72 over the cover 42.

In the manufacturing process, the sleeve 28 is preferably formed of a semi-rigid PVC compound which is crosshead extrusion coated onto the thin walled elongated metal tube 24. This coating which forms the sleeve 28 is bonded to the elongated metal tube 24 permanently by running heat activated adhesive over the outer surface of the metal tube 24 prior to the step of coating. The elongated metal tube is then passed through an induction heating coil to activate the adhesive and is then coated to form the sleeve having characteristics as above described.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. In a shopping cart structure including a shopping push cart mounted on wheels, the improvement of a push cart handle structure, means for mounting the push cart handle structure at one end of the shopping push cart for pushing the shopping push cart on said wheels, the push cart handle structure having an elongated metal tube, an elongated roundish sleeve mounted coaxially on said elongated metal tube, a bond securing said elongated metal tube and said elongated roundish sleeve in fixed joined relation together, the elongated roundish sleeve having an enlarged topside section, the enlarged topside section having an upwardly facing exterior surface, a transparent arcuately shaped cover engageable against said upwardly facing exterior surface, the transparent arcuately shaped cover having angularly extending cover ends extending in a common direction towards one another from opposite sides of the transparent arcuately shaped cover, sockets extending into the enlarged topside section of the elongated roundish sleeve, and an arcuately shaped member carrying advertising indicia nestingly engaged against the upwardly facing exterior surface on the elongated roundish sleeve, said transparent arcuately shaped cover having the angularly extending cover ends being engageable in said sockets to secure both the transparent arcuately shaped cover and the arcuately shaped member in unitary assembly with said elongated roundish sleeve.

2. The shopping cart structure of claim 1, wherein the sockets are positioned such that openings in the sockets face opposite directions relative to one another.

3. The shopping cart structure of claim 1, wherein the transparent arcuately shaped cover has opposite edges which are positioned above a horizontal axis extending through a midpoint of the push cart handle structure for minimizing the risk that the transparent arcuately shaped cover will become damaged when the push cart handle structure is subjected to an impact.

4. The shopping cart structure of claim 1, wherein the angularly extending cover ends are slidable longitudinally relative to the push cart handle structure with the cover ends being retainingly engageable in said sockets.

5. The shopping cart structure of claim 1, wherein means is provided at opposite ends of said elongated metal tube comprising a pair of stopper inserts, the pair of stopper inserts being retainingly secured in opposite open ends of said elongated metal tube for closing the open ends.

6. The shopping cart structure of claim 1, wherein the sockets for receiving said angularly extending cover ends of the transparent arcuately shaped cover have closed socket bottoms positioned remote and physically separated from a cavity underlying said cover to prevent the ingress of water and dirt into said cavity to contaminate the cavity and the arcuately shaped member carrying the advertising indicia.

7. The shopping cart structure of claim 1, wherein means is provided at opposite ends of said elongated metal tube comprising a pair of stopper inserts, the pair of stopper inserts being retainingly secured in opposite open ends of said elongated metal tube for closing the open ends, and a pair of handle end covers telescoped over opposite ends of said push cart handle structure, the handle end covers having an annular flange which is sized for extending around an outer perimeter of the elongated roundish sleeve including the enlarged topside section.

8. The shopping cart structure of claim 1, wherein the sockets are spaced apart from one another over at least 90° from a longitudinal axis of the elongated metal tube on an uppermost quarter of said handle structure to inhibit dirt from gaining entry beneath said cover.

9. A push cart handle structure for a shopping cart comprising: an elongated metal tube, an elongated sleeve mounted coaxially on said elongated metal tube, the elongated sleeve having an upwardly facing exterior surface, a transparent arcuately shaped cover engageable against said upwardly facing exterior surface, the transparent arcuately shaped cover having a pair of angularly extending cover ends extending inwardly in a hook-like configuration, a pair of sockets extending into the elongated sleeve parallel to one another, said transparent arcuately shaped cover having the angularly extending cover ends being engageable in respective sockets to secure the transparent arcuately shaped cover in unitary assembly with said elongated sleeve, the upwardly facing exterior surface adapted for receiving an arcuately shaped member carrying advertising indicia nestingly engaged against the upwardly facing exterior surface and positionable between the upwardly facing exterior surface and the transparent arcuately shaped cover.

10. The handle structure of claim 9, wherein the sockets are positioned such that openings in the sockets face opposite directions relative to one another.

11. The handle structure of claim 9, wherein the transparent arcuately shaped cover has opposite edges which are positioned above a horizontal axis extending through a midpoint of the push cart handle structure for minimizing the risk that the transparent arcuately shaped cover will become damaged when the push cart handle structure is subjected to an impact.

12. The handle structure of claim 11, wherein the angularly extending cover ends are slidable longitudinally relative to the push cart handle structure with the cover ends being retainingly engageable in said sockets.

13. The handle structure of claim 9, wherein means is provided at opposite ends of said elongated metal tube comprising a pair of stopper inserts, the pair of stopper inserts being retainingly secured in opposite open ends of said elongated metal tube for closing the open ends.

14. The handle structure of claim 9, wherein the sockets for receiving said angularly extending cover ends of the transparent arcuately shaped cover have closed socket bottoms positioned remote and physically separated from a cavity underlying said cover to prevent the ingress of water and dirt into said cavity to contaminate the cavity and the arcuately shaped member carrying the advertising indicia.

15. In a shopping cart structure including a shopping push cart mounted on wheels, the improvement of a push cart handle structure, means for mounting the push cart handle structure at one end of the shopping push cart for pushing the shopping push cart on said wheels, the push cart handle structure having an elongated metal tube, an elongated roundish sleeve mounted coaxially on said elongated metal tube, a bond securing said elongated metal tube and said elongated roundish sleeve in fixed joined relation together, the elongated roundish sleeve having an enlarged topside section, the enlarged topside section having an upwardly facing exterior surface, a transparent arcuately shaped cover engageable against said upwardly facing exterior surface, the transparent arcuately shaped cover having angularly extending cover ends extending in a common direction towards one another from opposite sides of the transparent arcuately shaped cover, sockets extending into the enlarged topside section of the elongated roundish sleeve, an arcuately shaped member carrying advertising indicia nestingly engaged against the upwardly facing exterior surface on the elongated roundish sleeve, said transparent arcuately shaped cover having the angularly extending cover ends being engageable in said sockets to secure both the transparent arcuately shaped cover and the arcuately shaped member in unitary assembly with said elongated roundish sleeve, the sockets being positioned in such a way in said enlarged topside section that openings defined by the sockets face in opposite directions relative to one another, the transparent arcuately shaped cover having opposite edges which are positioned above a horizontal axis extending through a midpoint of the push cart handle structure minimizing the risk that the transparent arcuately shaped cover can crack when the push cart handle structure is subjected to an impact, the sockets having closed socket bottoms remote and physically separated from a cavity underlying said cover for receiving said arcuately shaped member carrying advertising indicia with the transparent arcuately shaped cover providing a closure extending end-to-end of the push cart handle structure to prevent water and dirt from gaining entry into said cavity to contaminate the cavity.

16. The shopping cart structure of claim 15, wherein the angularly extending cover ends are slidable longitudinally relative to the push cart handle structure with the cover ends being retainingly engageable in said sockets.

17. The shopping cart structure of claim 16, wherein means is provided at opposite ends of said elongated metal tube comprising a pair of stopper inserts, the pair of stopper inserts being engageable in opposite open ends of said elongated metal tube for closing the open ends.

18. The shopping cart structure of claim 17, wherein the sockets are spaced apart from one another over 90° from a longitudinal axis of the elongated metal tube on an uppermost quarter of said handle structure to inhibit dirt from gaining entry beneath said cover, said cover having a thickness in the range of 0.035 to 0.040 inches.

\* \* \* \* \*